United States Patent
Hoefner (10) Patent No.: US 11,688,898 B2
(45) Date of Patent: Jun. 27, 2023

(54) ATTACHMENT ASSEMBLY, TOLERANCE COMPENSATION ASSEMBLY FOR AN ATTACHMENT DEVICE, AND ASSEMBLY METHOD FOR ATTACHING A BATTERY MODULE TO A COOLING DEVICE

(71) Applicant: AUDI AG, Ingolstadt (DE)

(72) Inventor: Dirk Hoefner, Wellheim (DE)

(73) Assignee: AUDI AG, Ingolstadt (DE)

( * ) Notice: Subject to any disclaimer, the term of this patent is extended or adjusted under 35 U.S.C. 154(b) by 368 days.

(21) Appl. No.: 16/788,630

(22) Filed: Feb. 12, 2020

(65) Prior Publication Data
US 2020/0266503 A1 Aug. 20, 2020

(30) Foreign Application Priority Data

Feb. 18, 2019 (DE) .......................... 102019202156.5

(51) Int. Cl.
| | | |
|---|---|---|
| *H01M 10/613* | (2014.01) | |
| *H01M 10/625* | (2014.01) | |
| *H01M 10/6554* | (2014.01) | |
| *F16B 5/02* | (2006.01) | |
| *F16B 5/06* | (2006.01) | |
| *H01M 50/264* | (2021.01) | |

(52) U.S. Cl.
CPC ............ *H01M 10/613* (2015.04); *F16B 5/02* (2013.01); *F16B 5/06* (2013.01); *H01M 10/625* (2015.04); *H01M 10/6554* (2015.04); *H01M 50/264* (2021.01); *H01M 2220/20* (2013.01)

(58) Field of Classification Search
CPC ............. H01M 10/613; H01M 10/625; H01M 10/6554; H01M 50/20; F16B 5/02
See application file for complete search history.

(56) References Cited

U.S. PATENT DOCUMENTS

| | | |
|---|---|---|
| 4,151,547 A | 4/1979 | Rhoades et al. |
| 4,621,961 A | 11/1986 | Gulistan |
| 5,501,122 A | 3/1996 | Leicht et al. |
| (Continued) | | |

FOREIGN PATENT DOCUMENTS

| | | |
|---|---|---|
| CN | 103687738 A | 3/2014 |
| CN | 104218271 A | 12/2014 |
| (Continued) | | |

OTHER PUBLICATIONS

German Search Report dated Dec. 6, 2019 in corresponding German Application No. 10 2019 202 156.5; 20 pages; Machine translation attached.

(Continued)

*Primary Examiner* — Jonathan G Jelsma
(74) *Attorney, Agent, or Firm* — Maier & Maier, PLLC (57) ABSTRACT

An attachment assembly with a battery module, a cooling device, and an attachment device for attaching the battery module to the cooling device. The battery module is arranged on the cooling device. A heat-conducting element is arranged between the battery module and the cooling device. The battery module has a first attachment component. The attachment assembly has a second attachment component, which is provided by a part of the cooling device or is connected to the cooling device. The first attachment component is attached to the second attachment component by the attachment device.

10 Claims, 2 Drawing Sheets

(56) References Cited

U.S. PATENT DOCUMENTS

| | | | |
|---|---|---|---|
| 6,250,839 B1 | 6/2001 | Lenhart | |
| 2011/0151299 A1* | 6/2011 | Park | H01M 50/20 |
| | | | 29/730 |
| 2014/0186674 A1* | 7/2014 | Goesmann | H01M 10/0481 |
| | | | 429/96 |
| 2014/0356684 A1 | 12/2014 | Lim | |
| 2018/0083329 A1* | 3/2018 | Acikgoez | H01M 10/613 |

FOREIGN PATENT DOCUMENTS

| | | | |
|---|---|---|---|
| CN | 107845749 A | | 3/2018 |
| CN | 108071648 A | | 5/2018 |
| CN | 108252994 A | * | 7/2018 |
| CN | 207830306 U | * | 9/2018 |
| DE | 102011082576 A1 | | 3/2013 |
| DE | 102014019696 A1 | | 6/2016 |
| DE | 102016217895 A1 | | 3/2018 |
| DE | 112016002628 T5 | | 4/2018 |
| WO | 2015/097238 A1 | | 7/2015 |

OTHER PUBLICATIONS

Office Action dated Apr. 2, 2022, in connection with corresponding Chinese Application No. 202010096793.7 (21 pp., including machine-generated English translation).
Office Action dated Oct. 19, 2022, in corresponding Chinese Application No. 2020100967937, 30 pages.

* cited by examiner

ATTACHMENT ASSEMBLY, TOLERANCE COMPENSATION ASSEMBLY FOR AN ATTACHMENT DEVICE, AND ASSEMBLY METHOD FOR ATTACHING A BATTERY MODULE TO A COOLING DEVICE

FIELD

The disclosure relates to an attachment assembly with a battery module for a motor vehicle, a cooling device for cooling the battery module, and with an attachment device for attaching the battery module to the cooling device. In doing so, the battery module is arranged on the cooling device and a thermally conductive element is arranged between the battery module and the cooling device, wherein the battery module has a first attachment component and the attachment assembly has a second attachment component, which is provided by a part of the cooling device or is connected to the cooling device, and wherein the first attachment component is attached to the second attachment component by means of the attachment device. The disclosure also relates to a tolerance compensation assembly for an attachment device for attaching a battery module to a cooling device and an assembly method for attaching a battery module to a cooling device.

BACKGROUND

DE 10 2016 002 628 T5 describes a thermoelectric module assembly for thermal conditioning of a component. The thermoelectric module assembly may be comprised of a cooling system, which is arranged on a battery. The thermoelectric module assembly in this case is mounted on a cold plate assembly, which is connected to a cooling circuit. In order to connect the individual components of the module assembly to one another, metallically formed attachment means can be used, such as screws for example. However, they can cause a thermal short-circuit between the components of the thermoelectric module assembly. For this reason, a thermal insulator is provided, which consists of a nonmetallic material and which isolates the attachment means from the components of the module assembly. The attachment means can be screwed into an inner diameter of the thermal insulator, said inner diameter being equipped with a thread, or a press-in closure can be used.

Furthermore, DE 10 2014 019 696 A1 describes a cell stack with a plurality of individual cells electrically connected to one another and a clamping sleeve for attaching the cell stack to a battery housing. The clamping sleeve in this case has a cross-section formed in the shape of an oval, wherein attachment elements, such as screws, can be inserted into the clamping sleeves in order to attach the cell stack to a battery housing. Due to the oval formation of the clamping sleeve, tolerance compensation can be achieved perpendicular to the attachment direction of said attachment elements.

Furthermore, DE 10 2011 082 576 A1 describes an assembly with an energy storage module, a module support, which constitutes a vehicle body, and a ball lock pin designed for attaching the energy storage module to the module support. A very quick attachment variant should thereby be enabled for attaching the energy storage module to the module support. However, a clamping device which comprises a clamping bolt, a clamping sleeve, and a threaded sleeve may also be used for the attachment. The threaded sleeve in this case has an inner thread and is arranged in a recess, into which the clamping bolt is to be screwed. When the threaded bolt is being screwed in, the clamping sleeve is clamped between said threaded bolt, particularly the conically shaped bolt head, and a cylindrically shaped hole within the energy storage module. The bolt head in this case has a diameter which is less than the inner diameter of the cylindrically shaped hole in order to insert it completely into said hole. The reason for this is that it should be screwed into the module support before the energy storage module is placed on the module support of the clamping bolts, including the clamping sleeve, in order to then place the energy storage module during assembly and subsequently screw the clamping bolt further into the module support.

There are thus numerous different attachment means and attachment options known from the prior art in order to attach components to one another and particularly in order to attach a battery module, for example, to a support. A particular challenge in this case is specifically the attachment of a battery module to a cooling device. Said cooling device in this case may also provide a base of a battery housing. In order to attach the battery module, especially screw connections have been determined to be particularly robust and reliable. In this case, battery modules may be screwed directly to the cooling base. However, it is simpler to attach the battery module to a frame, which in turn is durably connected to the cooling base and/or screwed to said cooling base or attached in some other manner. This attachment may take place, for example, by means of respective threaded flanges. The great challenge in doing this is that the battery module must be thermally connected to the cooling base to the extent possible, so that an efficient dissipation of heat is possible from the battery module to the cooling base. This will prevent air gaps between the battery module and the cooling base to the extent possible, because they are thermally isolating and thus reduce the cooling efficiency. Furthermore, a cooling base typically has unavoidable tolerances; this normally means the cooling base is never 100% flat but instead curved slightly, for example, in the direction of the battery module or in the opposite direction. This in turn results in relatively large tolerances between the module and the cooling base, which would be expressed as large air gaps between the module and the cooling base in the absence of countermeasures. Therefore, a thermally conductive element and/or a thermally conductive medium, frequently a so-called gap filler, which may constitute, for example, a thermally conductive paste and which is supplied between the battery module and the cooling base, is used as a countermeasure. To this end, the thermally conductive paste is typically applied to the cooling base and subsequently the battery module is placed on the thermally conductive paste and pressed in the direction of the cooling base, whereby the thermally conductive paste, which is normally relatively viscous, should be distributed. Because the cooling base has tolerances relative to the module, this means that such tolerances automatically develop between the screw-on point of the battery module and the screw-on point of the cooling base and/or of the second attachment component attached to the cooling base, such as a threaded flange of the frame, because distances result which are not foreseeable and which may vary from one module cooling base assembly to another. For example, if a screw-on flange attached to the cooling base and a screw-on flange attached to the module have a distance with respect to one another, it is not possible to hereby implement a tough screw connection, which is necessarily required, however, for the stability of this assembly. Accordingly, the aforementioned gap filler has been used, likewise indirectly, until now in order to compensate for this tolerance between the screw-on flanges. Thus, more thermally conductive paste is accordingly supplied between the battery module base and the cooling base in order to press, if possible, the battery module precisely in the direction of the cooling base until the screw-on flanges also lie on top of another and thus tough bolting applications can be implemented.

However, this has numerous disadvantages. For one thing, and this constitutes the greatest disadvantage, the distance between the battery module and the cooling base, which is filled with said thermal conductive paste, hereby also propagates. Even though this thermally conductive paste has better thermal conductivity than air, its thermal conductivity is still significantly worse compared to that of metal, for example, such that a large thermal resistance results between the battery module and the cooling base, which counteracts effective module cooling, due to this relatively large, particularly even larger, gap. In addition, further disadvantages are that the thermally conductive paste is also very expensive to the extent that larger gaps also accordingly play a larger role in costs, and the increased required mass of thermally conductive paste also significantly increases the weight of the entire battery, particularly a high-voltage battery for a motor vehicle. A heavy weight, however, has an especially disadvantageous effect, particularly in connection with electric vehicles with respect to their maximum range.

SUMMARY

Thus, the object of the present disclosure is to provide an attachment assembly, a tolerance compensation assembly, and an assembly method for attaching a battery module to a cooling device, which enables the smallest gap widths possible between the battery module and the cooling device.

Said object is achieved by means of an attachment assembly, by a tolerance compensation assembly, and by an assembly method.

An attachment assembly according to the disclosure with a battery module for a motor vehicle additionally has a cooling device for cooling the battery module and an attachment device for attaching the battery module to the cooling device. In this process, the battery module is arranged on the cooling device and a thermally conductive element, such as the previously described gap filler, is arranged between the battery module and the cooling device. Furthermore, the battery module has a first attachment component, wherein the attachment assembly has a second attachment component, which is provided by a part of the cooling device or is connected to the cooling device. In doing so, the first attachment component is attached to the second attachment component by means of the attachment device. The attachment device in this case is designed such that, by means of the attachment device, tolerance compensation can be provided between the first attachment component and the second attachment component in a particular attachment direction, which extends in the direction from the battery module to the cooling device.

Due to such an attachment device, the tolerance compensation in the attachment direction can then advantageously be provided by means of the corresponding attachment means, which is comprised of the attachment device, and thus no longer has to be implemented by the thermally conductive paste. In this case, the disclosure is based on the knowledge that there are attachment devices which particularly also incorporate screws and which enable such tolerance compensation in the attachment direction. Such attachment devices can then advantageously be used to attach the first attachment component to the second attachment component in order to establish a stable connection between the components, even in the case of a distance between these two components with respect to one another caused by tolerance. Because this tolerance compensation between the two components, which are attached to one another for attaching the battery module to the cooling device, can now advantageously be provided by the attachment device itself and no longer has to be directly provided via the thermally conductive paste, significantly smaller gap widths can be advantageously implemented between the battery module and the cooling device, whereby the cooling efficiency can be increased significantly and especially material, costs, and weight can be saved.

Moreover, in order to attach the battery module, several of such attachment devices can be used as well. Furthermore, a battery module preferably comprises at least one battery cell such as, for example, a lithium-ion cell; however, it is preferred for a battery module to comprise several of such battery cells. Moreover, several battery modules can also be attached to the cooling device in this manner. Thus, a high-voltage battery for an electric vehicle, for example, can be provided by the several battery modules.

As previously described at the start, the cooling device may furthermore simultaneously provide a base of a battery housing in which the battery module is accommodated, particularly several battery modules may also be accommodated. To this end, the cooling device may be provided such that it comprises a base plate, for example made of metal, which forms the base of the battery housing, wherein a cooling unit is arranged, for example bonded, to the bottom of said base. This cooling unit may constitute, for example, a cooling plate equipped with cooling channels. This cooling plate with the cooling channels provided therein, and/or generally the aforementioned cooling unit, may also itself form the base of the housing, however, without the additional base plate.

The battery housing may furthermore have a circumferential frame, which is attached to the cooling device. Furthermore, the battery housing may also have separating webs or separating walls in order to separate individual mounting areas for the respective battery modules from one another, at least partially. These separating walls and/or separating webs may also be arranged on the cooling device. The second attachment component, which is provided by a part of the cooling device or is connected to the cooling device, may then constitute, for example, also a part of the frame and/or such a separating web or a separating wall. In other words, the battery module may either be attached directly to the cooling device, that is at the base of the battery housing, via the first attachment component or indirectly via a part of the frame and/or a separating wall of the battery housing.

Furthermore, the first attachment component may constitute, for example, a part of the module housing such as, for example, a screw-on flange, which protrudes, at least partially, on the module housing of the battery module.

The thermally conductive element may constitute, for example, a thermally conductive medium such as, for example, the aforementioned gap filler, particularly a thermally conductive paste. The thermally conductive element, however, may also constitute a thermally conductive film or the like.

In an especially advantageous embodiment of the disclosure, the first attachment component has a cylindrically shaped passage and the second attachment component has a cylindrically shaped recess with an inner thread. In this case, the attachment device has a screw with a screw head and a screw grip with an outer thread, wherein the screw, at least its end opposite the head, extends through the cylindrically shaped passage, and is screwed into the cylindrically shaped recess, wherein the attachment device is designed such that a clamping force directed perpendicularly with respect to the attachment direction is established between the screw and the first attachment component by screwing in the screw starting at a first screw-in depth to the point of a second screw-in depth, which defines an end position.

The further the screw is screwed into the second attachment component, the tighter the screw will be clamped in the first attachment component. In doing so, a maximum clamping force, for example, can be defined, which simultaneously specifies the end position of the screw. Advantageously, a screw torque corresponding to this maximum clamping force can then be defined and the screw can be screwed in until this maximum screw torque is reached. This simplifies assembly enormously, because such a screw can be screwed in to a defined maximum screw torque, which simultaneously specifies the end position of the screw and ensures a secure fit of the screw and thus also a stable connection between the battery module and the cooling device, in order to attach the battery module to the cooling device. The clamping force advantageously makes it possible to define an end position of the screw independently of tolerances in the attachment direction. In other words, the screw can thereby easily be screwed in until the necessary clamping force is reached regardless of whether, for example, the first attachment component lies on the second attachment component or not, and particularly also regardless of whether the screw head, for example, is placed in contact with the upper side of the first attachment component or not.

In particular, it is even preferable for the attachment device to be designed such that the screw, in its end position with its screw head, specifically does not rest on the first attachment component and/or the upper side thereof, which is defined as that facing the screw head. The reason for this is that the screw is moved with its screw head in the direction of the first attachment component during the screw-in process. In this case, it should be possible to move the screw until the maximum clamping force defining the end position is reached. However, this is only possible when the screw head, which preferably has a diameter larger than the cylindrical passage in the first attachment component, does not rest on the first attachment component beforehand, because otherwise screwing the screw in further would be prevented, although the desired maximum clamping force had not yet been achieved. The screw head may also have a diameter smaller than the cylindrically shaped passage in the first attachment component; however, this is less preferred as will be explained in greater detail subsequently.

The outer thread on the screw grip in this case does not have to extend, in particular, beyond the entire screw grip, but instead may be arranged, for example, only in the area of the end of the screw grip opposite the screw head. Furthermore, the screw grip should preferably be designed longer than the passage so that, in the end position, the screw head is still protruding above this passage. This has the advantage that the screw head may be thusly designed with a larger diameter than the cylindrically shaped passage, because the screw head does not have to penetrate into this passage. Furthermore, the cylindrically shaped recess, which is situated in the second attachment component, may likewise be designed as a passage, i.e. be open below, or closed below. Because the screwed-in screw does not have to be secured at the bottom with a nut or the like, the cylindrically shaped recess may also be closed below, i.e. in the direction of rotation.

In a further very advantageous embodiment of the disclosure, the attachment device has a clamping cone, which is arranged on the screw grip, and an expansion sleeve, which is arranged with a first part in the cylindrically shaped passage, and which is arranged, with an end facing away from the screw head, so as to have contact with an edge area of the cylindrical recess. The expansion sleeve is thus supported at the bottom, i.e. in the attachment direction, by the second attachment component, because it rests on the edge area about the cylindrical recess in the second attachment component. This expansion sleeve thereby cannot be moved further in the direction of the second attachment component, i.e. in the attachment direction, during assembly. If the screw with the clamping cone is thus inserted through the cylindrically shaped passage in the first attachment component and accordingly also through the expansion sleeve and screwed with the end thereof into the second attachment component, then the clamping cone accordingly presses on the expansion sleeve, expanding it, whereby increased tension is also achieved advantageously as the threaded connection is tightened.

In doing so, it is furthermore especially advantageous when the expansion sleeve has a second part, which is not arranged in the cylindrical passage and which provides the end of the expansion sleeve facing away from the screw head, wherein a length of the second part corresponds to a distance between the first attachment component and the second attachment component. As previously described, the first and the second attachment component normally have a distance between one another due to tolerance. The expansion sleeve precisely spans this distance due to tolerance with the second part of the expansion sleeve, which protrudes evenly over the cylindrical passage at the bottom in the first component such that the expansion sleeve, as previously described, rests in the edge area about the cylindrical recess on the second attachment component. The rest of the expansion sleeve is correspondingly situated in the cylindrical passage of the first attachment component. In particular, no part of the expansion sleeve protrudes beyond an upper side of the cylindrical passage in the first attachment component. In other words, the end of the clamping sleeve facing away from the second attachment component is situated completely within the cylindrical passage of the first attachment component.

Only in this manner can a clamping force be achieved due to the expansion effect of the upper end of the expansion sleeve in order to tighten the screw within the first attachment component.

In order for the second part of the expansion sleeve to be able to adapt its length to the distance between the first and the second attachment component, it is further especially advantageous when the expansion sleeve is arranged opposite the first attachment component in a moving manner in the cylindrical passage. Thus, the expansion sleeve may be inserted, for example particularly in a state in which it is already placed on the screw, as is explained in greater detail subsequently, into the cylindrical passage in the attachment direction and then pushed into said passage until the lower part of the expansion sleeve, which is facing the second attachment component, protrudes from the cylindrical passage at the bottom and finally makes contact with the second attachment component, namely in the edge area about the cylindrical recess of the second attachment component. Depending on how large the distance due to tolerance is between the first and second attachment component, a corresponding part of the expansion sleeve protrudes below from the cylindrical passage of the first attachment component.

In a further especially advantageous embodiment of the disclosure, the attachment device is designed such that the screw is moved in the direction of the expansion sleeve relative to the expansion sleeve and the screw head when the screw is screwed into the second attachment component such that an end of the expansion sleeve facing the screw head, said end preferably tapering in the direction of the screw head, is pushed partially over the clamping cone and is clamped between the clamping cone and the first attachment component with a clamping force which increases until the end position of the screw is reached.

In the preferred starting assembly, thus the clamping cone is situated on the screw grip of the screw and preferably such that it is directly connected to the screw head in the attachment direction. The screw with the clamping cone can thus be inserted into the expansion sleeve and this assembly in turn into the cylindrical passage of the first attachment component. The expansion sleeve can thusly likewise rest against the screw grip, that is on the lower part thereof. The inner diameter of the expansion sleeve and the inner diameter of the clamping cone in this case may be substantially equal such that they correspond to the maximum outer diameter of the screw grip. If the screw is then screwed into the cylindrical recess of the second attachment component, a relative movement is thus forcibly created between the screw with the clamping cone placed thereupon and the expansion sleeve, because it rests on the edge area about the cylindrical recess and, contrary to the screw, cannot penetrate into this recess. Thus, the expansion sleeve with its upper part, which is thus facing the screw head, is pushed over the clamping cone, which is particularly placed onto the screw such that the clamping cone tapers from the screw head in the direction of the expansion sleeve, in the attachment direction. Thus, if the expansion sleeve is pushed over the clamping cone, the expansion sleeve must thus enlarge its inner diameter in the upper part, which is pushed over the clamping cone, due to the increasing diameter of the clamping cone. This leads to expansion of the upper part of the expansion sleeve. However, because the upper part of the expansion sleeve is situated in the cylindrical recess of the first attachment component, the dimension of this expansion is limited. The result of this is that the expansion sleeve is increasingly tightened between the clamping cone and the first attachment component within the cylindrical recess and/or cylindrical passage of the first attachment component, and that is with increasing clamping force, until the end position of the screw is reached, which can be defined by a maximum clamping force. In this manner, an especially stable attachment of the battery module to the cooling device is achieved.

Essentially it is also conceivable that, in order to attach the first attachment component to the second attachment component, the expansion sleeve is first pushed into the cylindrical passage of the first attachment component until it has reached its end position and makes contact with the second attachment component, and the screw with the clamping cone placed thereupon can subsequently be screwed in. However, it is advantageous when the clamping sleeve is first pushed onto the assembly comprising the screw and the clamping cone, and then this overall assembly is pushed into the cylindrical passage of the first attachment component and partially pushed through it. As is provided according to a further advantageous embodiment of the disclosure, it is namely especially advantageous when the clamping sleeve and/or the screw has a retainer such that the expansion sleeve can be arranged on the screw in a captive manner. The assembly can hereby be simplified enormously, because, in this manner, both the clamping cone and the expansion sleeve can already be preassembled on the screw in advance. In order to attach a battery module to the cooling device, this preassembled assembly must then only be inserted or guided into the cylindrical passage of the first attachment component and screwed to the second attachment component. Individual elements of the attachment device then do not have to be handled during assembly and individually put into position one after the other. Enormous time can thereby be saved during the attachment.

Such a retainer may be designed in different types and forms. To this end, numerous variants for forming such a retainer are already known from prior art. For example, the expansion sleeve may have a raised section protruding inward, particularly a circular raised section which also surrounds the inner diameter of the expansion sleeve, particularly in the form of a spring, which engages a corresponding circular groove which surrounds the outer diameter of the screw. In general, such a retainer may be formed as a clamp and/or latch or the like. For example, if the clamping cone is pushed onto the screw grip, particularly until it makes contact with the screw head, and subsequently the expansion sleeve is pushed onto the screw or onto the screw grip from below, particularly to the point of engagement of the retainer, the clamping cone is thus also automatically attached to the screw in a captive manner, and a separate retainer is not required here. Nevertheless, a further retainer may also be provided, especially on the screw and/or the clamping cone, to enable arrangement of the clamping cone on the screw in a captive manner, independently of the expansion sleeve.

The retainer between the expansion sleeve and the screw, and optionally between the clamping cone and the screw, is additionally preferably designed such that separation of the expansion sleeve and/or clamping cone and screw is only possible using a predefined minimum tensile force in or opposite a direction which extends parallel to the screw grip, wherein this minimum force is greater than the weight force of the expansion sleeve, particularly when combined with the weight force of the clamping cone. Thus, loosening of the expansion sleeve and the clamping cone from the screw solely due to the weight force is advantageously prevented.

Furthermore, it is preferred when the expansion sleeve has several cuts and/or slots, which extend in the attachment direction, at the end of the expansion sleeve facing the screw head in the circumferential direction. The upper part of the expansion sleeve is thereby divided into individual strips, which may spread apart from each other when the expansion sleeve is pushed over the cone. In order to withstand the high assembly and attachment forces, it is furthermore preferable for both the clamping cone and the expansion sleeve to be produced from metallic material.

Essentially, the clamping cone may also be designed with the screw as a single piece. However, it is especially advantageous when the clamping cone is produced as a separate attachment component and can be pushed onto the screw grip. The clamping cone thus likewise has a cylindrical passage, which has a diameter that is at least as large as the outer diameter of the screw grip. In other words, the clamping cone may be designed so as to move relative to the screw grip. This has the especially extensive advantage that customary and reliable screws can be used in order to attach the battery module to the cooling device, and no specially produced screws with cone-shaped heads or the like have to be provided for this. The clamping cone and the expansion sleeve may be produced as separate components and simply placed onto customary screws such that the attachment device can be provided in an especially simple and economical manner.

In a further advantageous embodiment of the disclosure, the screw head has a diameter that is greater than a diameter of the cylindrical passage. This likewise has the advantage that customary screws can be used to attach the battery module to the cooling device, said screws typically having screw heads that are significantly larger in diameter than the screw grips thereof anyhow, for example. Furthermore, the diameter of the cylindrical passage in the first attachment component should also not be too large, i.e. not significantly greater than the outer diameter of the expansion sleeve, because this has the advantage that only a slight expansion of the expansion sleeve is necessary in order to achieve a very high clamping force. Thus, the expansion sleeve can also be designed with very thin walls, which saves weight and material. The same then accordingly applies as well to the clamping cone. Due to the enlarged screw head, an additional safety mechanism can furthermore be provided, which prevents, for example, the battery module with the first attachment component from simply sliding over the screw head opposite the attachment direction, for example in the event of an unusually high impact force, such as in an accident for example. In other words, not only is a friction- and/or force-fitting connection established between the screw and the battery module, but a positive-locking connection is also provided by the enlarged screw head.

Furthermore, the disclosure also relates to a tolerance compensation assembly for an attachment device for attaching a battery module to a cooling device for cooling the battery module and for providing tolerance compensation between the battery module and the cooling device in a particular attachment direction, which extends in the direction from the battery module to the cooling device. In doing so, the tolerance compensation assembly has a clamping cone, which can be arranged on a screw grip of a screw of the attachment device, and an expansion sleeve, by means of which the screw can be inserted with an end facing away from the screw head, wherein the expansion sleeve and the clamping cone are designed such that, when the expansion sleeve has relative movement with respect to the screw with the clamping cone arranged on the screw grip and the end of the screw passing through the expansion sleeve, such that the screw head moves in the direction of the expansion sleeve, an end of the expansion sleeve facing the screw head, said end preferably tapering in the direction of the screw head, is pushed partially over the clamping cone and is spread apart.

The advantages described for the attachment assembly according to the disclosure apply in a similar manner to the tolerance compensation assembly according to the disclosure. Moreover, the further objective features explained in context with advantageous embodiments of the attachment assembly enable the enhancement of the tolerance compensation assembly according to the disclosure due to further corresponding features.

Furthermore, the disclosure also relates to an assembly method for attaching a battery module to a cooling device for cooling the battery module by means of an attachment device, wherein the battery module is arranged on the cooling device and a thermally conductive element is arranged on the cooling device such that the thermally conductive element is situated between the cooling device and the battery module, before the battery module is attached by means of the attachment device. Furthermore, the battery module has a first attachment component, which is attached to a second attachment component by means of the attachment device, said attachment component being provided by a part of the cooling device or being connected to the cooling device. In this case, a tolerance between the first attachment component and the second attachment component in a particular attachment direction, which extends in the direction from the battery module to the cooling device, is compensated for during attachment of the first attachment component to the second attachment component, due to the attachment device.

The advantages listed for the attachment assembly according to the disclosure and the embodiments thereof apply in a similar manner to the assembly method according to the disclosure. Moreover, the objective features listed in association with the attachment assembly according to the disclosure and the embodiments thereof enable the enhancement of the assembly method according to the disclosure through further corresponding method steps.

Furthermore, it may be provided that, when the thermally conductive element is arranged on the cooling device, the thermally conductive element is placed on the cooling device before or after the battery module is arranged on the cooling device. For example, the thermally conductive element may initially be placed on the cooling device, for example the upper side thereof, and subsequently only the battery module can be placed on the upper side of the cooling device with the thermally conductive element arranged thereupon. However, it may also be provided that the battery module is initially placed on the upper side of the cooling device and subsequently the thermally conductive element is molded or injected into the gap between the battery module and the cooling device. In both cases, the thermally conductive element is finally situated between the cooling device and the battery module, and that is before the battery module is attached by means of the attachment device.

Furthermore, a motor vehicle with an attachment assembly according to the disclosure or one of its embodiments should also be considered part of the disclosure. The attachment assembly may then particularly be designed as a high-voltage battery with a cooling device.

The vehicle according to the disclosure is preferably designed as a motor vehicle, particularly as a passenger car or commercial vehicle, or as a passenger bus or motorcycle.

BRIEF DESCRIPTION OF THE DRAWINGS

The following is shown.

DETAILED DESCRIPTION

The exemplary embodiments explained in the following refer to preferred embodiments of the disclosure. With the exemplary embodiments, the described components of the embodiments represent individual features to be considered independently of one another, which also further embody the disclosure independently of one another. Thus, the disclosure should also comprise combinations of the features of the embodiments other than those shown. Furthermore, the described embodiments can also be supplemented through further described features of the disclosure.

The same reference numerals refer to equivalent features and functions in the figures.

Figure 1:
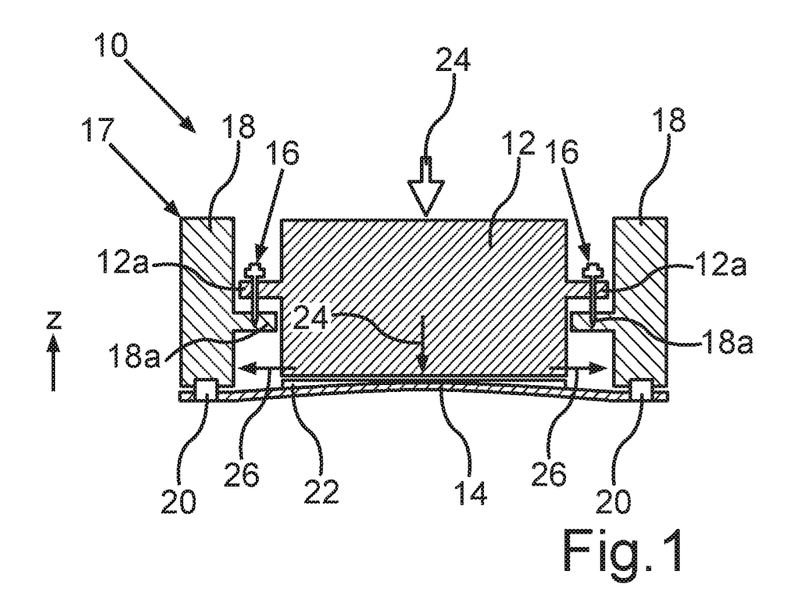
FIG. 1 a schematic representation of an attachment assembly with a battery module and a cooling device as well as an attachment device for attaching the battery module to the cooling device according to an exemplary embodiment of the disclosure.

FIG. 1 shows a schematic representation of an attachment assembly 10 with a battery module 12 and a cooling device 14 as well as an attachment device 16 for attaching the battery module 12 to the cooling device 14 according to an exemplary embodiment of the disclosure. The cooling device 14 in this case may be designed as a cooling base with cooling channels, which are not shown in this example for the sake of clarity and through which a coolant can flow, particularly a liquid and/or gaseous coolant. The cooling base and/or the cooling device 14 can thus also simultaneously represent the base of a battery housing 17, which also has a frame 18, in addition to the base provided by the cooling device 14, on said frame the cooling device 14 is attached at the bottom, for example by means of suitable attachment elements 20.

In order to enable good dissipation of heat from the battery module 12 to the cooling device 14, the battery module 12 should rest as thoroughly as possible on the housing base and/or the cooling device 14. To ensure that no air gaps, which are thermally isolating, develop between the battery module 12, particularly the lower side thereof, and the cooling device 14, a thermally conductive element 22 such as, for example, a gap filler and/or a thermally conductive paste or even a thermally conductive film, is placed between the battery module 12 and the cooling device 14. Such a gap filler in this case typically constitutes a relatively viscous thermally conductive paste. This can be applied, for example, first to the housing base, namely the cooling device 14, and subsequently the battery module 12 can be placed in the housing 17 on the cooling device 14 and pressed against the cooling device 14. This pressing of the battery module 12 in this case is indicated by the arrow 24 in FIG. 1. Due to this press-on force 24, the thermally conductive element 22 is distributed between the battery module 12 and the cooling device 14 in that said thermally conductive element is pressed outward, which is indicated by the arrow 26.

In order to then attach the battery module 12 to the cooling device 14, the battery module 12, for example the module housing thereof, has one or several screw-on flanges 12a. These flanges are attached with corresponding attachment components, which are likewise designed as flanges 18a in this example. In this case, these flanges 18a may be provided by the cooling device 14 itself or, as in this example, provided by the frame 18 attached to the cooling device 14.

The cooling device 14 which provides the housing base in this case is typically not even, however, but has elevation tolerances, which are shown by way of example in FIG. 1 by a slight curving of the cooling device 14 in the direction of the battery module 12. These tolerances may be completely different from assembly to assembly. Due to such different curves of the cooling device 14, the screw-on flange 12a of the battery module 12 also typically does not rest on the corresponding screw-on flange 18a of the cooling device 14 or of the frame 18; instead, larger or smaller gaps always result between these two screw-on flanges 12a, 18a.

Due to these gaps, durable screw connections cannot be implemented between these flanges 12a, 18a with conventional screw connections. In order to still enable a stable attachment of these two attachment components 12a, 18a to one another, previous attempts have been made to provide tolerance compensation in the Z direction shown here by using a larger quantity of thermally conductive element 22. Due to the fact that there is a larger quantity of thermally conductive element between the battery module and the cooling device, such a battery module can then be pressed downward, i.e. opposite the Z direction shown, until the two screw-on flanges lie on top of one another. However, this disadvantageously results in significantly larger gaps between the cooling device and the battery module, which greatly reduces the cooling efficiency and leads to a significantly higher weight and also increased costs of this battery assembly.

According to the disclosure, significantly smaller gaps can then advantageously be implemented between the battery module 12 and the cooling device 14, and stable connections can then be established between the battery module 12 and the cooling device 14, which is enabled by the use of an attachment device 16, which is designed such that tolerance compensation can be provided between the two attachment components 12a, 18a in the attachment direction, which extends in the direction from the battery module 12 to the cooling device 14, i.e. opposite the Z direction shown here. Because such a tolerance compensation can then advantageously be provided by the attachment device 16 itself, the additional quantity of thermally conductive paste 22 can be dispensed with, thereby increasing the cooling efficiency and reducing weight and costs. This attachment device 16 will now be described in greater detail with reference to FIG. 2 to FIG. 5.

Figure 2:
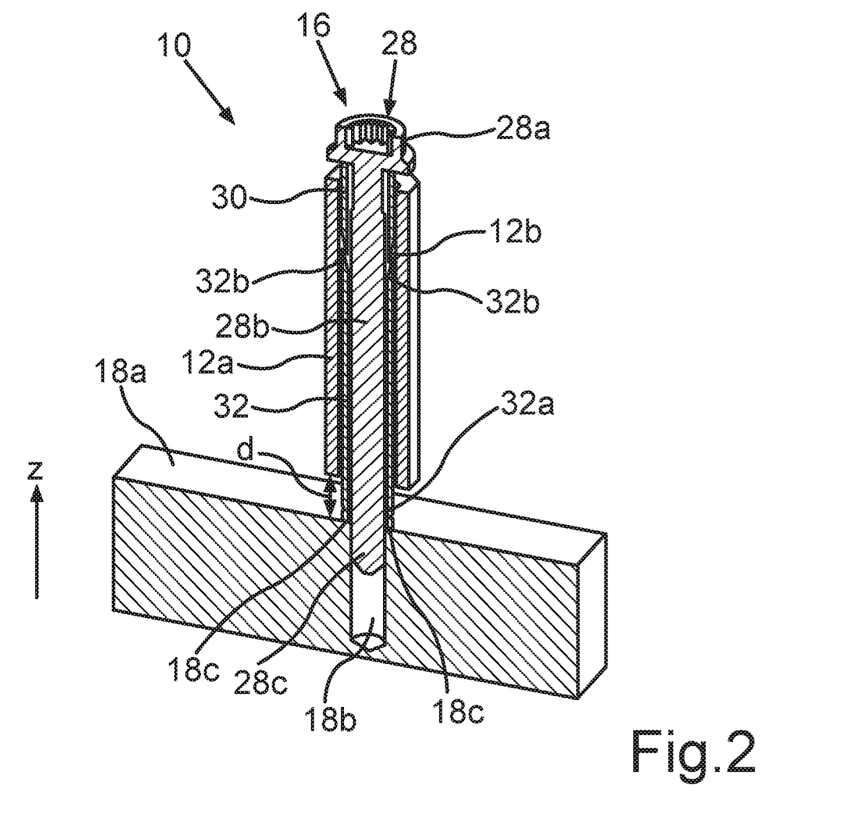
FIG. 2 a schematic representation of a part of the attachment assembly in a cross-section through the attachment device according to an exemplary embodiment of the disclosure.

FIG. 2 in this case shows a schematic representation of a part of the attachment assembly 10 with the attachment device 16 in a cross-section according to an exemplary embodiment of the disclosure. In this example, only the screw-on flange 12a of the battery module 12 is shown in cross-section, as well as the corresponding attachment component 18a of the frame 18 or the cooling device 14. The first attachment component 12a, i.e. the screw-on flange 12a of the battery module 12, initially has a cylindrically shaped passage 12b. Furthermore, the second attachment component 18a has a cylindrically shaped recess 18b with an inner thread, which is not shown in greater detail here, into which the screw 28 of the attachment device 16 can be screwed. In this case, the screw 28 may be designed as a conventional screw and has a screw head 28a as well as a screw grip 28b, which is equipped at least partially with an outer thread. In particular, the screw 28 has such an outer thread at least on an end 28c opposite the screw head 28a. Furthermore, the attachment device 16 comprises a clamping cone 30, which is arranged on the screw grip 28b. In particular, this clamping cone 30 may easily be pushed onto the screw grip 28b, preferably such that it then rests directly on the screw head 28a. Accordingly, this clamping cone 30 likewise has a cylindrical passage which has a diameter that is at least as large as the outer diameter of the screw grip 28b. The outer diameter of this clamping cone 30 in this case tapers from the screw head 28a in an attachment direction, i.e. opposite the Z direction shown here. The clamping cone 30, however, does not have to be designed completely conical in its cross-section, but instead may also comprise a cylindrical section, as shown here, which initially connects to the screw head 28a and subsequently has the part tapering in the attachment direction.

Furthermore, the attachment device also has an expansion sleeve 32, which is partially situated within the cylindrical passage 12b of the first attachment component 12a and which partially protrudes downward from the cylindrical passage 12b. In particular, the lower end 32a of this expansion sleeve 32 lies directly on the second attachment component 18a, and that is in an edge area 18c about the cylindrical recess 18b. Depending on the distance d between the first and the second attachment component 12a, 18a, a somewhat large part of this expansion sleeve 32 is thus situated within the cylindrical passage 12b of the first attachment component 12a. If the screw 28 is then screwed into the cylindrical recess 18b, the screw 28, together with the clamping cone 30, moves relative to this expansion sleeve 32, particularly such that the screw head 28a moves in the direction of the expansion sleeve 32, whereby the expansion sleeve 32, which rests on the second attachment component 18a downward and thus cannot escape in the attachment direction, is partially pushed over the clamping cone 30. Associated with this, the upper part 32b of the expansion sleeve 32 spreads apart and is clamped between the clamping cone 30 and the first attachment component 12a within the cylindrical passage 12b. The further the screw head 28a and accordingly also the clamping cone 30 is moved downward in the attachment direction onto the second attachment component 18a, the greater this clamping force that is directed perpendicularly with respect to the Z direction shown and thus also perpendicular to the attachment direction. A maximum clamping force in this case may define an end position of the screw 28. Thus, a stable attachment can be established advantageously between the battery module 12 and the cooling device 14, independently of distance d between the two attachment components 12a, 18a.

Figure 3:
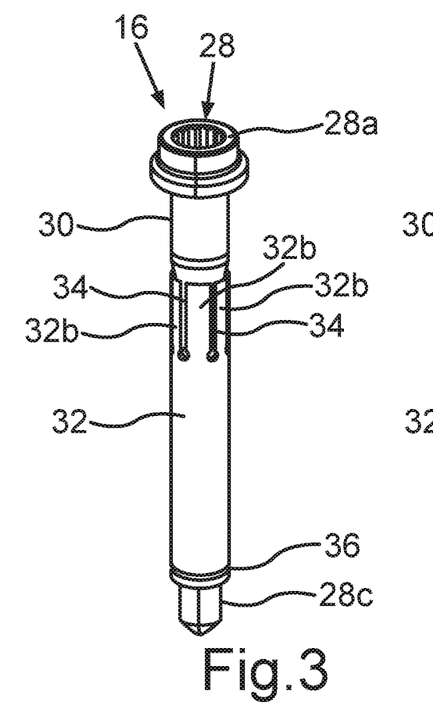
FIG. 3 a schematic and perspective representation of an attachment device with a screw, a clamping cone, and an expansion sleeve, according to an exemplary embodiment of the disclosure.

FIG. 3 shows a schematic representation of the attachment device 16 according to an exemplary embodiment of the disclosure again, in a detailed perspective view. The figure shows, in turn, the screw 28 with the screw head 28a, the lower end 28c of the screw 28 with the outer thread, which is actually not shown here, as well as the clamping cone 30 pushed onto the screw grip 28b, and likewise the expansion sleeve 32 pushed onto the screw grip 28b. As is clearly shown in FIG. 3, the expansion sleeve 32 has slots 34 on the upper end 32b thereof, whereby the upper part 32b of the expansion sleeve 32 is divided into individual segments and/or segments. This advantageously enables simple expansion of the upper part 32b of the expansion sleeve 32.

Furthermore, it is preferable for the clamping cone 30 and the expansion sleeve 32 to be placed on the screw 28 in a captive manner. To this end, the expansion sleeve 32 has a retainer 36 in this example. It may accordingly be designed as a clamping device or latching device or the like. Such a retainer 36 enables simple preassembly of the attachment device 16, which simplifies the attachment process enormously.

Figure 4:
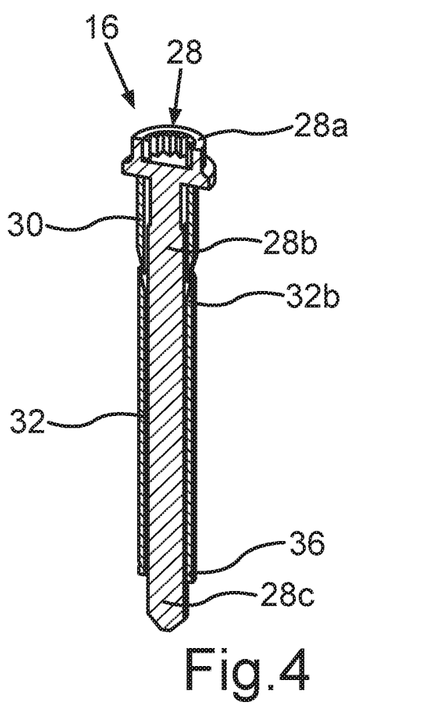
FIG. 4 a schematic representation of the attachment device from FIG. 3 in a cross-section according to an exemplary embodiment of the disclosure.

FIG. 4 shows the attachment device 16 according to FIG. 3 again, in a schematic cross-sectional view.

Figure 5:
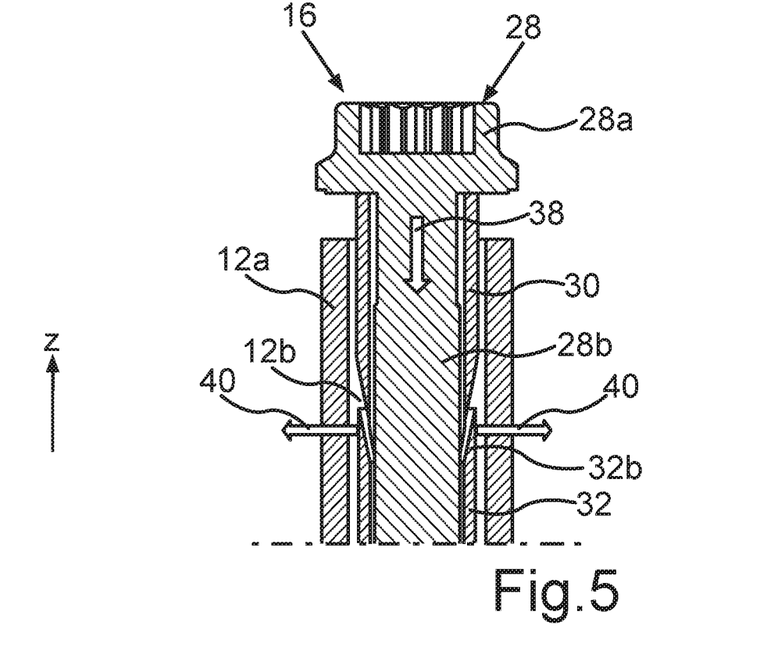
FIG. 5 a schematic representation of a part of the attachment assembly with the upper part of the attachment device in a cross-section according to an exemplary embodiment of the disclosure.

FIG. 5 shows the upper part of the attachment device 16 again in a detailed cross-section, particularly in a state in which it is inserted into the cylindrical passage 12b of the first attachment component 12a. This again illustrates how the screw is screwed into the attachment direction and, in doing so, is moved in the attachment direction, wherein the movement of the screw 28 in the attachment direction is indicated by the arrow 38. The upper part 32b of the expansion sleeve 32 is thereby expanded in the direction of the arrow 40, because these upper parts 32b are pushed over the clamping cone 30 and/or the lower part thereof. In order to simplify the gliding by of the clamping cone 30 and the expansion sleeve 32, the individual links of the upper part 32b of the expansion sleeve 32 are likewise designed to taper in the direction of the clamping cone 30. During expansion of this upper part 32b, the individual links 32b, however, cannot be moved outward as far as is desired; instead, they are limited in their movement due to the inner wall of the first attachment component 12a. These upper parts 32b of the expansion sleeve 32 are thereby clamped between the clamping cone 30 and the inner wall of the first attachment component 12a and thus cause a clamping force which is directed perpendicularly with respect to the Z direction shown and likewise perpendicularly with respect to the attachment direction, wherein the screw 28 is stably and durably retained within the cylindrical passage 12b of the first attachment component 12a.

In order to provide as much stability as possible and to be able to withstand the high forces that occur during attachment, both the expansion sleeve 32 and the clamping cone 30 and particularly also the screw 28 are made of a metallic material.

As a whole, the examples show how a high-voltage battery tolerance compensation can be provided by the disclosure for the battery module installation, wherein the battery module can be placed on the cooling base and the threaded connection is free to move so to speak in the assembly direction by means of the attachment device such that the tolerance chain is only limited to the module base and cooling base components and/or the evenness thereof. The gap between the module and the cooling plate is thereby reduced significantly such that only a small quantity of thermally conductive medium is required. The threaded connection can then advantageously be tightened perpendicularly during the tightening process with respect to the assembly direction, particularly in the mount thereof, and thus affixes the battery module to the battery housing in a force-fitting manner.

The invention claimed is:

1. An attachment assembly for securing a battery module of a motor vehicle, the attachment assembly comprising:
   a cooling device for cooling the battery module, and
   an attachment device comprising a screw head which secures the battery module against the cooling device,
   wherein a thermally conductive element is provided to fill gaps between the battery module and the cooling device,
   wherein the battery module comprises a first attachment component comprising a cylindrical passage, which is secured by the attachment device to a second attachment component,
   wherein the second attachment component is part of the cooling device or is connected to the cooling device,
   wherein the attachment device is configured to accommodate a gap between the first and second attachment components in an installed state,
   wherein the screw head has a larger diameter than the cylindrical passage, and wherein the attachment device is screwed into the second attachment component until a predetermined screw torque is reached and, in the installed state, there is a gap between the screw head and the first attachment component.

2. The attachment assembly according to claim 1, wherein the second attachment component comprises a threaded recess, wherein the attachment device further comprises a screw grip having an outer thread, wherein the attachment device extends through the cylindrical passage and screws into the threaded recess, and wherein screwing the attachment device into the threaded recess from a first depth to an end depth causes a clamping force perpendicular to an axis of the attachment device to be exerted between the first attachment component and the attachment device.

3. The attachment assembly according to claim 2, wherein the attachment device further comprises a clamping cone and an expansion sleeve, wherein the clamping cone is arranged on the screw grip, adjacent to the screw head, and wherein the expansion sleeve is movably retained on the screw grip and has a first part coinciding with the cylindrical passage and a second part which spans the gap between the first and second attachment components.

4. The attachment assembly according to claim 3, wherein the attachment device is configured such that screwing the attachment device from the first depth towards the end depth causes a tapered end of the cone to push beneath the expansion sleeve, expanding the expansion sleeve and thereby increasing the clamping force.

5. The attachment assembly according to claim 4, wherein the expansion sleeve rests against the second attachment component.

6. The attachment assembly according to claim 3, wherein the expansion sleeve and/or the screw has a retainer such that the expansion sleeve can be arranged on the screw in a captive manner.

7. The attachment assembly according to claim 3, wherein the clamping cone is moveable relative to the screw grip.

8. The attachment assembly according to claim 1, wherein the second attachment component is part of the cooling device and the battery module is directly secured against the cooling device.

9. The attachment assembly according to claim 1, wherein a circumferential frame with an open bottom comprises the second attachment component and the circumferential frame is attached to the cooling device, such that the battery module is secured against the cooling device via the circumferential frame and through the open bottom.

10. A method for securing a battery module against a cooling device for cooling the battery module, comprising:

applying a thermally conductive element to the cooling device, the thermally conductive element provided to fill gaps between the cooling device and the battery module, arranging the battery module on the cooling device, and securing the battery module against the cooling device using an attachment device, the attachment device comprising a screw head, wherein the battery module comprises a first attachment component comprising a cylindrical passage, which is secured by the attachment device to a second attachment component, wherein the second attachment component is part of the cooling device or is connected to the cooling device, wherein the attachment device is configured to accommodate a gap between the first and second attachment components in an installed state, wherein the screw head has a larger diameter than the cylindrical passage, and wherein the attachment device is screwed into the second attachment component until a predetermined screw torque is reached and, in the installed state, there is a gap between the screw head and the first attachment component.

* * * * *